United States Patent [19]

Kendall

[11] Patent Number: 4,826,372
[45] Date of Patent: May 2, 1989

[54] PRE-LOCKED PULL-TYPE BLIND FASTENER

[75] Inventor: James W. Kendall, Huntington Beach, Calif.

[73] Assignee: Victor Pastushin, Marina del Rey, Calif.

[21] Appl. No.: 893,582

[22] Filed: Aug. 6, 1986

[51] Int. Cl.⁴ ............................................. F16B 13/04
[52] U.S. Cl. ...................................... 411/43; 411/38; 411/70
[58] Field of Search .................................. 411/34–38, 411/41, 43, 55, 69, 70

[56] References Cited

U.S. PATENT DOCUMENTS

| | | | |
|---|---|---|---|
| 2,038,189 | 4/1936 | Morris | 411/34 |
| 2,061,628 | 11/1936 | Huck | 411/43 |
| 2,435,144 | 1/1948 | Kubicki | 411/34 |
| 2,526,235 | 10/1950 | Huck | 411/43 |
| 3,148,578 | 9/1964 | Gapp . | |
| 3,178,989 | 4/1965 | Siebol | 411/38 |
| 3,253,495 | 3/1966 | Orloff . | |
| 4,012,984 | 3/1977 | Matuschek . | |
| 4,127,345 | 11/1978 | Angelosanto . | |
| 4,230,017 | 10/1980 | Angelosanto . | |
| 4,432,679 | 2/1984 | Angelosanto . | |

FOREIGN PATENT DOCUMENTS 2151738 7/1985 United Kingdom ................ 411/43

OTHER PUBLICATIONS

Huck Manufacturing Co., Blind Bolt Fastener-Form No. CA. 102/83 3M.
Huck Manufacturing Co., Unimatic Single Action Non-Shifting Blind Rivet System-Form CA110 11-782, Rev. 796M.
Huck Manufacturing Co., Conical Keystone Lock Blind Rivet-Form No. 8-388, Rev. 1-59.
Huck Manufacturing Co., Unimatic Blind Bolt Fastening System-CA 131 5/83.

*Primary Examiner*—Neill Wilson
*Attorney, Agent, or Firm*—Natan Epstein; William H. Pavitt, Jr.

[57] ABSTRACT

A pull-type blind fastener has a pin slideable through a tubular selectively annealed sleeve, the pin having a pin head permanently bonded to a blind side end of the sleeve, a hollow rivet head formed on the opposite end of the sleeve, and a raised abutment on the rivet head engageable by a conventional rivet setting tool. The rivet head collapses under the differential pulling force applied by the setting tool to a condition of reduced aperture for engaging a stop shoulder on the pin thus limiting axial pin travel at a flush breaking position.

33 Claims, 2 Drawing Sheets

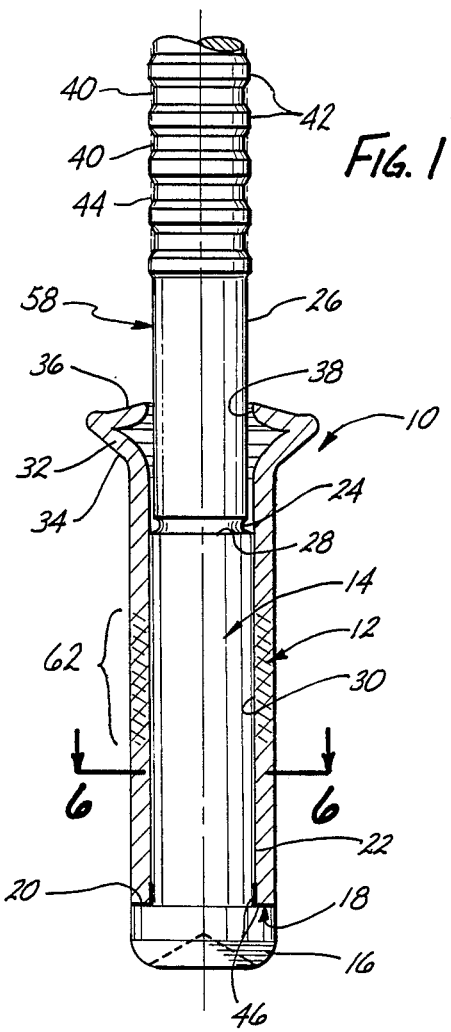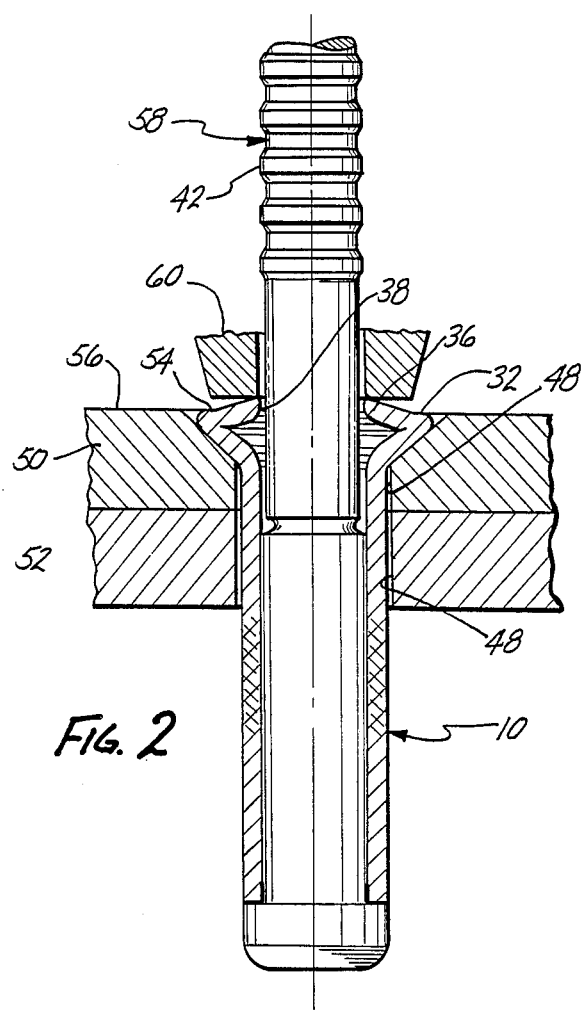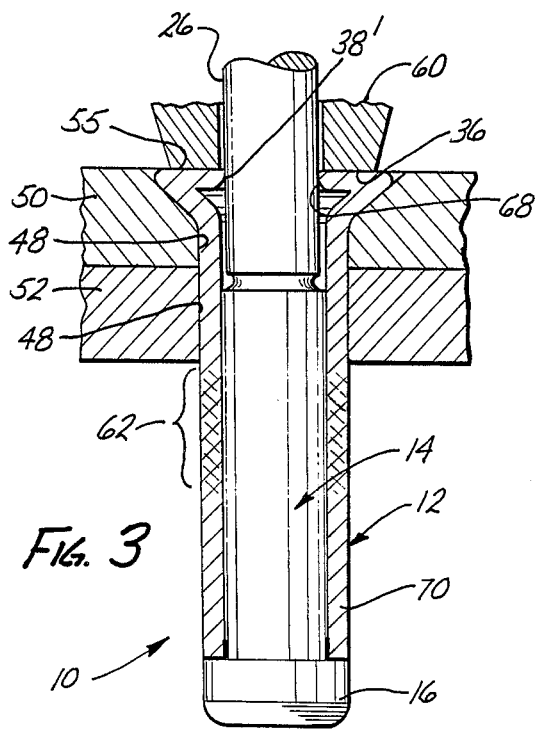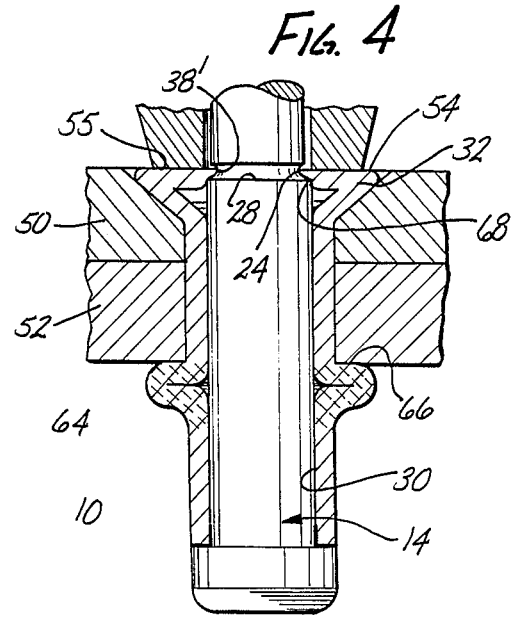

PRE-LOCKED PULL-TYPE BLIND FASTENER

BACKGROUND OF THE INVENTION

1. Field of the Invention

The present invention pertains generally to the field of fasteners and is more particularly directed to a pull-type blind fastener of the type having a pin and sleeve wherein the pin and sleeve are pre-locked, i.e. permanently bonded to each other prior to fastener installation.

2. State of the Prior Art

Pull-type blind fasteners have as their primary components a tubular sleeve and a pin axially movable through the sleeve. The pin has a pin head or equivalent element which engages one end of the sleeve. The opposite or free end of the pin extends from the sleeve and typically has a series of pull grooves which permit the pin to be positively gripped within the nose of an installation tool. The fastener is installed by inserting the sleeve in an installation hole formed in the workpiece to be fastened and the tool nose is placed against the outer end of the sleeve with the grooved pin end within the nose. Upon actuation the installation tool applies pulling relative axially compressive load on the sleeve until the sleeve wall buckles to form a bulb or head on the blind side of the workpiece, which remains secured between the blind-side bulb and a rivet head pre-formed on the exposed end of the sleeve. The excess length of the pin is broken off at a break groove flush with the rivet head.

The shear strength of the installed fastener is attributable in large part to the sleeve, but the remaining pin portion does contribute importantly in this respect and installed fastener shear strength is significantly compromised by separation of the pin from the sleeve. Provision is therefore made for retaining the pin within the installed sleeve either by a friction lock in non-critical applications or by a positive mechanical interlock for critical applications such as aircraft frames. In either case the locking of the pin to the sleeve occurs during fastener installation, prior to which the pin portion which remains after installation is not axially fixed to the sleeve.

Many blind fastener designs are known featuring mechanical pin locking as part of the fastener installation procedure. The mechanical locking action is presently achieved either by a separate locking collar element carried on the pin and forced by the installation tool into a locking groove in the pin as exemplified by U.S. Pat. No. 4,012,984, to Matuscheck and Pratt, No. 4,451,189 among many others, or by compressively flowing sleeve material into a locking groove in the pin to create the required mechanical interlock as in Fry et al U.S. Pat. No. 3,292,482 and in Mil-R-007885 rivets. In both cases the need for a locking groove weakens the pin.

Important criteria in fastener performance are the size and strength of the blind side bulb formed and the degree of hole fill achieved by swelling and radial expansion of the sleeve within the workpiece. Existing fastener designs suffer from significant drawbacks in these respects as illustrated by the following examples selected from some of the most popular aerospace blind fasteners currently in use.

In a first type of currently available blind rivet (meeting MIL-R-7885 and NAS1738,39 specifications) blind head formation is accomplished by either a separate compressible element such as the collapsible barrel of Pratt U.S. Pat. No. 4,541,189 or the integral shear ring used in Matuschek U.S. Pat. No. 4,012,984 among others, the functions of which is to firstly place a compressive load on the blind side sleeve end to initiate fastener hole filling action, and to secondly slide within the exposed blind-side end of the sleeve thereby creating a large bearing blind head. The integral shear ring or separate compressible element yields or collapses axially as necessary to accommodate differences in workpiece thickness within a permissible grip range characteristic of the particular fastener. This yielding allows continued travel of the pin through the sleeve to a point where it engages a mechanical locking element at which point the portion of the pin protruding from the sleeve can be broken off flush with the sleeve head.

Fasteners of this first type perform adequately but suffer from the following disadvantages:

(a) The shear ring integral to the pin or the separate compressible element axially mounted on the pin are tolerance critical and require costly methods of manufacture the expense of which is ultimately borne by the end user.

(b) The fastener installation loads i.e. the magnitude of relative pulling force between the sleeve and the pin of the fastener necessary for blind head formation and to compress the sleeve so that it swells radially to obtain adequate filling action are inordinately high. This results in a need to use dissimilar materials for the sleeve and the pin as exemplified by Gapp, U.S. Pat. No. 3,148,578, the most popular combination of materials being an aluminum sleeve mated with a heat treated, cadmium plated alloy steel pin. By using a stronger pin material than the sleeve material, the pin diameter necessary to axially collapse the sleeve can be kept relatively small in relation to the sleeve cross section. This is desirable because the installed tensile strength of the fastener depends primarily on the sleeve wall thickness which it is therefore desirable to maximize in relation to the pin cross section for a given fastener diameter. Such combination of dissimilar materials carries a weight penalty caused by the relatively heavy steel pin in addition to the corrosion problems associated with dissimilar metals.

A second type of fastener which attempts to overcome the problems of dissimilar materials is disclosed in Orloff U.S. Pat. No. 3,253,495 and such fasteners are available under specifications MS90353/54, MS21140/41, and NAS1919/21. These blind fasteners are characterized in that a variable hardness gradient is created in the sleeve by selectively annealing the blind head formation zone. The annealed sleeve section is softer than the end sections of the sleeve and bulges more readily under axial loading to form the blind head. The selective annealment alone however is not sufficient to allow use of similar pin and sleeve material with a favorable pin/sleeve cross-sectional ratio. These fasteners typically require further weakening of the sleeve by providing an enlarged hole portion in the sleeve so as to reduce the sleeve wall thickness along the annealed section and thereby reduce the installation load necessary to form the blind head in order to make the sleeve operative in combination with pins made of similar material to the sleeve. Sleeves of this type therefore have a stepped inside diameter or a counterbored through hole. This approach allows a relative increase in sleeve wall thickness within the workpiece hole, but the sleeve wall thickness along the blind head formation zone remains relatively thin compared to the pin diameter in that zone. The pin/sleeve fractional percentage ratio of overall fastener cross sectional area along the bulb formation zone is generally 30/70 while within the workpiece hole where the sleeve through-hole is of smaller diameter the same ratio is approximately 50/50. In these fasteners the blind head is formed by a pin head in external abutment with the blind side sleeve end. The pin head is compressively forced against the end of the sleeve, causing the variable hardness gradient section to bulge outwardly at the blind-side sheet line of the workpiece, forming a large bearing blind head. The pin travels axially through the sleeve compressing the blind sleeve end until the pin engages a mechanical locking element which stops the pin with a break groove in alignment with the sleeve head so that the pin breaks off flush with the sleeve head. The performance trade-off in such fasteners is that while the sleeve section of reduced wall thickness yields readily to the compressive force exerted by the pin head, little or no compressive workpiece hole filling action occurs in the sleeve section of heavier wall thickness. Fasteners of this type (MS 90353/54 and MS 21140/41 type fasteners) are therefore generally referred to as blind bolts since no hole filling action is apparent. A variant of this same basic design is found in NAS1919/21 type blind fasteners in that an additional hole filling feature is included and these latter fasteners are therefore considered to be blind rivets. The hole filling feature consists of an enlarged diameter portion on the pin which is forced or dragged through the sleeve along the reduced through-hole section, extruding and expanding radially outwardly the sleeve as the pin is pulled through. This sleeve expansion is not uniform through the workpiece because the enlarged pin portion or plow does not travel or act on the full length of the sleeve and also because no radial sleeve expansion occurs in the thinner walled counterbored section of the sleeve.

Fasteners of this second group meet all desired functional requirements including the use of similar pin and sleeve materials, but retain the following disadvantages:

(a) The stepped inside diameter or counter-bore of the sleeve is tolerance critical, both from a size and concentricity standpoint and can only be formed from the sleeve blind end in the manufacture of the sleeve. The necessity for a thin walled section at the blind end of the sleeve to maintain low blind head formation loads compounds the tolerance criticality of the fastener structure. Failure to maintain the necessary tolerances results in frequent improper blind head formations ("tulip bulbs") which require costly remake or rework activities.

(b) The blind rivet fasteners of the second group variant having the aforementioned additional hole filling feature require greater blind-side clearance because the pin extends out of the sleeve to a greater extent due to the enlarged extrusion element provided on the pin. Also, the stepped inside diameter of the sleeve causes variable hole fill so that the hole fill is not uniform through the full length of the installation hole in the workpiece. Such variable hole fill can also head to improper blind head formations.

(c) The blind side heads formed by these rivets are particularly weak because their formation load must be safely below any other fastener installation load, i.e. the mechanical lock engagement loads between the pin and the sleeve (with or without frictional forces therebetween taken into account) and the pin breakoff load at the breakneck.

The outer sleeve diameter of a given fastener, and therefore the combined sleeve wall and pin cross sectional areas, is selected according to the requirements of the particular application and is set by the installation hole in the workpiece. In other words, the overal fastener or sleeve diameter is largely determined by factors external to the fastener itself. The relative proportions of the overall fastener cross-section attributable to the sleeve wall and to the pin however are a function of fastener design. For a given outer sleeve diameter, it is generally desirable to maximize the sleeve wall thickness in order to maximize installed fastener tensile strength. However, sleeve wall thickness can only be increased at the expense of a reduction in the pin diameter. As the sleeve wall thickness is increased, it offers proportionally greater resistance to axial compression by the pin and thus a greater installation load is needed between the pin and the sleeve. As the pin diameter is decreased to obtain a heavier sleeve wall, the strength of the pin is proportionally diminished until a pin diameter is reached where the pin would break prematurely under the required installation load. In prior art fasteners pin strength has been compromised by the need to provide various features, structures and grooves such as locking grooves, steps, etc. on the pin, of which the pin break groove must necessarily be the smallest so as to prevent the pin from breaking at an improper point. At the same time, the pin break groove diameter sets an upper limit for the pulling force which can be applied to the pin during fastener installation, which in turn limits sleeve wall thickness, the size and strength of the blind heads, and the degree and extent of hole fill achieved.

Further, because of the internal steps, counterbores and other features required on sleeves of prior art fasteners it is conventional in the art to fabricate the sleeves from solid wire stock by a progressive cold forming process which makes it very difficult to maintain close tolerances in uniformity of sleeve wall thickness, concentricity of the sleeve bore and squareness of the blind side sleeve end surface against which bears the pin head. All these are factors which affect the uniformity and reliability of the joints obtained with the fasteners and close control over the same is highly desirable.

A continuing need therefore exists for fasteners having superior pin strength in relation to maximum pin diameter so that heavier sleeves can be compressed for a given pin diameter resulting in stronger and larger blind-side heads, improved and more uniform hole fill, and greater installed fastener strength while using similar pin and sleeve materials. Such an improved fastener should be simple and inexpensive to manufacture with a minimum number of parts. It is further desirable to make the fastener parts from raw materials and by manufacturing processes which minimize tolerance criticality problems.

SUMMARY OF THE INVENTION

The present invention addresses these and other shortcomings of prior art fasteners by providing a pull-type blind fastener having a sleeve of continuous inner diameter with a sleeve head formed at one end, and a pin axially slideable through the sleeve but permanently bonded to the blind-side end of the sleeve. Unlike previously known pulltype fasteners, the pin is pre-locked to the sleeve prior to installation to thereby eliminate the need for either a locking collar element or a locking groove on the pin. As a result, the pin break groove can be enlarged in diameter thereby increasing the maximum installation load which can be applied to the pin. The sleeve head is deformable and folds inwardly upon application of the relative pulling force so as to engage a stop element on the pin thereby limiting axial travel of the pin through the sleeve.

The pin shank includes a first shank section adjacent to the pre-locked pin end having a first diameter substantially equal to the internal diameter of the sleeve, and a second shank section of reduced diameter which extends through the bore in the sleeve head to protrude exteriorly to the sleeve. Annular lands are formed on the protruding shank portion defining therebetween a series of pull grooves on the second shank section. The land crests have a diameter intermediate the first and second shank section diameters and preferably equal to the diameter of the first shank section. The pull groove diameter may be only slightly smaller than the diameter of the second shank section so as not to substantially weaken the pin. An annular stop shoulder is defined at the transition between the first and second pin shank sections and a pin break groove or breakneck is defined on the second shank section preferably immediately adjacent the stop shoulder. The breakneck is sized so as to be the weakest point along the pin shank, but because of the small depth of the pull grooves permitted by the use of annular lands and the absence of other grooves, it is possible to minimize the depth of the breakneck, and thus retain strength considerably in excess of what has been possible in prior art fastener pins of comparable installed diameter. The diameter of the first pin shank section is the installed diameter of the pin since the second shank section is broken off at the pin break groove once the fastener has been installed.

In a presently preferred embodiment the pin is provided with an enlarged pin head which is exterior to the sleeve and abuts against the blind-side end of the sleeve so as to lock the pin against axial travel towards the sleeve head. The pin is pre-locked to the sleeve by metallurgically bonding the pin head to the blind-side sleeve end, thus permanently locking the pin head against withdrawal and separation from the sleeve. The sleeve head has a generally conical centrally apertured end wall coaxial with the sleeve and forming an abutment for the nose of the fastener installation tool. The pin shank including the annular lands defining the pull grooves pass through the sleeve head aperture in its normal condition. When the protruding pull-grooved portion of the pin shank is engaged by the installation tool, the tool nose bears against the abutment which yields under the installation loading and folds to a condition where the central opening in the sleeve head is reduced in aperture for engaging the stop shoulder on the pin to thus limit axial travel of the pin through the sleeve with the break groove aligned for flush pin breaking.

A hardness gradient is created in an intermediate section of the sleeve wall in relation to the hardness of the end portions of the sleeve by selectively annealing the sleeve wall in the manner taught by Orloff in U.S. Pat. No. 3,253,495. Upon sufficient axial compressive loading of the sleeve between the sleeve head and the blind-side end by the installation tool, the sleeve collapses axially and expands preferentially within the softer annealed section to form the blind-side bulb. The bulb forming process tends to reverse the weakening effect of the annealing process and to restore the treated section of sleeve wall at least partially to its original hardness, thereby improving the strength of the formed bulb. Further, the annealed sleeve section can collapse axially to a greater or lesser extent and within limits permits a range of operative fastener grips so as to accommodate variations in workpiece thicknesses for a particular fastener size.

A "flagging" feature for spotting improper fastener installations may be incorporated by constructing and configuring the pin head such that it cannot alone withstand the pulling force applied to the pin during fastener installation, but will withstand the fastener installation load in cooperation with the pre-locking bond between the pin head and the sleeve. Thus, in the event that the pre-locking bond fails to meet minimum strength criteria in a particular fastener, the pin head will fail structurally and allow the pin to travel axially through the sleeve beyond a flush breaking position so that a portion of the first shank section will protrude through the sleeve head providing an immediate visual indication or "flag" of a substandard joint.

A still further benefit derived from the novel fastener design is that the annular pre-locking bond between the pin head and the sleeve seals the sleeve bore against internal fluid flow through the fastener. The installed fastener joint can therefore be made completely fluid-tight by provision of a simple external seal between the sleeve and the workpiece, such as an O-ring, a resilient washer or jacket about the sleeve, or a layer of liquid sealing compound applied over the fastener sleeve prior to its insertion into the workpiece installation hole. Fluid-tight blind rivets are highly desirable particularly in the construction of so-called wet aircraft wings where the hollow wing also serves as a fuel tank. In the past, attempts to construct fluid-tight blind rivets have been frequently frustrated because of internal leakage through the fastener sleeve bore, a problem overcome by the present invention.

The present fastener design optimizes pin strength for a given installed pin diameter, thus permitting more favorable pin-to-sleeve cross sectional area ratios, resulting in improved installed fastener strength. The enhanced installation load tolerance of the pin permits the use of similar pin materials for both sleeve and pin, eliminating the aforementioned problems associated with the use of dissimilar metals. The lack of internal features and smooth bore allows the sleeve to be manufactured from continuous wall thickness constant diameter tubing stock ensuring a high degree of uniformity in sleeve characteristics, particularly in terms of sleeve wall thickness and concentricity which reduces the likelihood of improper blind head formations common in prior art fasteners. Sleeve blanks are prepared by cutting off tubing sections from greater lengths of tubing stock and the sleeve head is readily formed as by cold forming on the sleeve blanks. The pin is then inserted through and bonded to the fabricated sleeve.

These and other advantages of the present invention will be better understood from the following detailed description of the preferred embodiment considered with reference to the accompanying drawings.

BRIEF DESCRIPTION OF THE DRAWINGS

FIG. 1 is a longitudinal view partly in section of a blind fastener according to the present invention.

FIG. 2 is a similar view of the fastener of FIG. 1 disposed within aligned openings in a workpiece to be fastened, and showing the fastener engaged by the nose of an installation tool preliminary to setting of the fastener.

FIG. 3 shows the fastener of FIG. 2 in a first intermediate stage of the setting process prior to formation of the blind head.

FIG. 4 shows the fastener of FIG. 3 in a more advanced intermediate stage of the setting process wherein the blind head has formed but prior to pin break off.

FIG. 8b shows a sleeve with a formed countersink style head for a fastener according to this invention fabricated from the sleeve blank shown in FIG. 8a.

FIG. 8d shows a sleeve with a formed protruding style sleeve head for a fastener according to this invention fabricated from the sleeve blank shown in FIG. 8c.

DETAILED DESCRIPTION OF THE PREFERRED EMBODIMENTS

Figure 5:
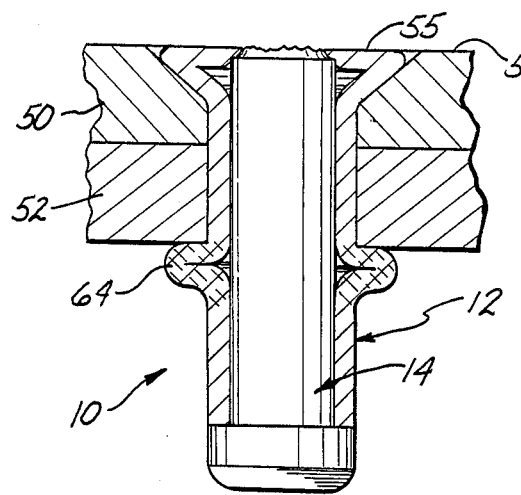
FIG. 5 shows the fastener of FIG. 1 fully installed.

With reference to the drawings, FIG. 1 shows a blind fastener 10 constructed according to the present invention. The fastener 10 includes a tubular sleeve 12 and a pin 14 disposed axially through the sleeve. The pin 14 includes a generally cylindrical pin head 16 external to the sleeve 12 and in abutting contact with the blind-side end 18 of the sleeve. The pin head 16 has an annular undersurface 20 which defines a substantially square shoulder with the pin shank. The blind-side sleeve end 18 is cut square to the longitudinal axis of the sleeve so as to form an annular transverse end surface perpendicular to the sleeve axis and opposing the pin head undersurface 20. The shank of the pin 14 includes a first shank section 22 which has a diameter substantially equal to the internal diameter of the sleeve 12, or just slightly undersized thereto so as to make a close sliding fit with the sleeve. Shank section 22 is immediately adjacent to the pin head 16 and terminates at a breakneck groove 24. A second pin shank section 26 extends from the breakneck 24 to a free outer end (not shown) of the pin 14. The second shank section 26 has a diameter reduced in relation to the diameter of first shank section 22. The diametral transition between the two shank sections forms an annular substantially square stop shoulder 28 at the end of shank section 22 adjacent to the pin break groove 24.

The sleeve has a hollow clamshell shaped sleeve head 32 formed at its outer end. Between the blind-side end 18 and the sleeve head, the sleeve 12 is of uniform outer diameter and has a smooth internal through-bore 30 of uniform diameter. In the illustrated embodiment the sleeve head 32 is of the countersink style and has a conical undersurface 34. The sleeve head terminates in an outwardly facing end wall defining a generally conical truncated raised abutment 36 centrally apertured by a sleeve head through-bore 38 coaxial with the sleeve bore 30.

The first shank section 22, the breakneck groove 24 and an inner portion of the second shank section are contained within the sleeve 12 while the second shank section 26 of reduced diameter extends through the sleeve head bore 38 and terminates exteriorly to the sleeve 12. A series of annular lands 42 and pull grooves 40 are roll formed on the exterior portion 58 of the second shank section 26. Roll forming results in metal displacement such that when a thread, annular groove or the like is rolled into the part, the crest of the annular land grows in diameter by approximately the same amount as the root or groove diameter decreases. It is therefore well understood in the art that rolling is done in a pitch diameter 44 (indicated in dotted lining in FIG. 1) which is approxiamtely one groove height less than the desired finished outside diameter of the rolled section, i.e. the land diameter 42.

In the fastener of FIG. 1, the sleeve bore 30, the first pin shank section 22, the sleeve head bore 38 and the pull groove lands 42 are all substantially equal in diameter. The portion of the second pin shank section 26 lying between the pull grooved portion and the breakneck 24 is smaller in diameter than the sleeve head bore 38 and equal to the pull groove pitch diameter 44.

Figure 7:
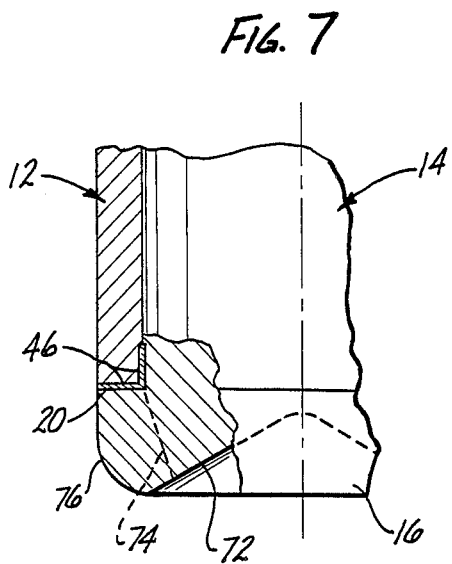
FIG. 7 is an enlarged view of the fastener portion enclosed in circle B in FIG. 1 showing the pre-locking bond between the pin head and the sleeve.

The fastener is assembled by inserting the pin 14 into the blind-side end of the sleeve 12 until the pin head 16 abuts against the sleeve. In an initial or normal condition of the fastener 10 before installation, the rim of the sleeve head bore 38 makes a near net fit with the pull groove lands 42 i.e. allows the pull grooved portion of the pin to just past through the sleeve head without diametrical interference. Once the pin is assembled to the sleeve, the sleeve and the pin are permanently joined together by an annular pre-locking bond 46 between the pin head undersurface 20 and the blindside end surface of the sleeve as indicated in FIG. 1. The pre-locking bond may be formed by brazing, soldering, or other suitable metallurgical process capable of forming a high-strength bond with the particular pin and sleeve materials used. For steel alloy materials silver brazing has been found suitable. The pre-locking bond 46 is annular, extending the full circumference of the sleeve end surface and annular pin head undersurface 20, and as better seen in FIG. 7 further extends axially a small distance into the space between the pin shank and the sleeve. The pre-locking bond thus has a butt end component and an axial component, the latter being primarily responsible for cooperating with the pin head in resisting the fastener installation load. Molten solder is directed into the sleeve bore for forming the axial component of the bond by a slight chamfer or similar shape at the end of the sleeve bore which can be easily and conveniently formed by appropriately shaping the bottom stop which supports the sleeve blank during cold formation of the sleeve head. the bond 46 also makes a fluid tight seal between the pin head 16 and the sleeve 12, closing the sleeve bore 30 against fluid flow.

An intermediate section 62 of sleeve 12 is selectively annealed to create a hardness gradient between the sleeve ends. The hardness gradient includes a zone of reduced hardness of the sleeve material in relation to the untreated end portions of the sleeves. Thus, the hardness of the sleeve material is uniform along the undertreated end sections of the sleeve and falls off towards a minimum hardness within the annealed section 62. For a more detailed explanation of the sleeve annealment and of the hardness gradient obtained thereby reference is made to U.S. Patent 3,253,495 issued to Orloff.

Installation of the fastener 10 to make a joint in a workpiece is shown in the sequence comprising FIGS. 2-5. Turning to FIG. 2, the fastener 10 is shown inserted into aligned workpiece openings 48 defined in juxtaposed workpiece panels 50 and 52 to be joined by means of fastener 10. The hole 48 in outer panel 50 is shaped to define a conical seat for the undersurface 34 of the sleeve head 32 such that the top 54 of the sleeve head 32 is flush with the outer surface 56 of workpiece panel 50. The conical abutment 36 projects from the sleeve head top 54 and terminates at the circular edge of bore 38 above the panel surface 56.

The outer pull-grooved portion 58 of the pin stem is engaged by the nosepiece of a conventional single action, pull-type installation tool with the driving anvil 60 of the nosepiece bearing against the uppermost end of the raised abutment 36, i.e. against the rim surrounding the sleeve head bore 38. In the initial condition of FIG. 2, the sleeve head 32 only partially contacts the anvil 60 due to the raised abutment 36. While only the nose portion of the installation tool is illustrated, its construction, function and operation are well known in the art. In general, the projecting end 58 of the pin is engaged within the installation tool which, when actuated, pulls axially on the pin while applying a reaction force against the sleeve head 32 through the nosepiece anvil 60.

Turning to FIG. 3 which illustrates a first intermediate stage of the fastener installation, relative pulling force has been applied by the installation tool between the pin and the sleeve head, causing the nose anvil 60 to react against and push inwardly on the raised abutment 36, folding and flattening the raised abutment to an installed condition where the sleeve head 32 has a substantially flat outer or end face 55 flush with the workpiece face 56. Upon flattening of the conical abutment the sleeve head bore 38 is reduced from its normal aperture to a smaller diameter 38' substantially equal to the diameter of second pin shank section 26 but in any event smaller than the diameter of first pin shank section 22. At this stage, the relative pulling force applied between the pin and the sleeve is squeezed between the pin head 16 and the nosepiece 60. The compressive axial loading of the sleeve 12 causes the sleeve wall 70 to begin to swell diametrically and to fill the openings 48 in the workpiece panels as the sleeve expands diametrically.

As the relative pulling force continues, the compressive force on the sleeve causes the sleeve wall in the softer selectively annealed section 62 to buckle radially outwardly and form a large bulbed blind head 64 as shown in FIG. 4. The bulb 64 so obtained has a relatively large annular bearing surface 66 which bears against the blind-side of workpiece panel 52. The axial collapse of the sleeve 12 attendant to blind head formation allows the pin 14 to travel axially through the portion of the sleeve disposed within the workpiece openings 48 and through the sleeve head bore 38' until the stop shoulder 28 comes into contact with the edge 68 of the reduced sleeve head bore 38', mechanically stopping further axial travel of the pin through the sleeve bore 30 with the pin break groove 24 positioned for proper flush breaking with the outer face 55 of the sleeve head 32.

Continued pulling force applied by the installation tool breaks the pin 14 at the groove 24 flush with both the sleeve head and the outer surface 56 of the workpiece 50 as shown in FIG. 5, which shows the fastener in its final installed or set condition. The section 22 of the pin which remains within the sleeve is locked against withdrawal and separation from the sleeve by the pre-locking bond 46 between the pin head and the sleeve.

Figure 6:
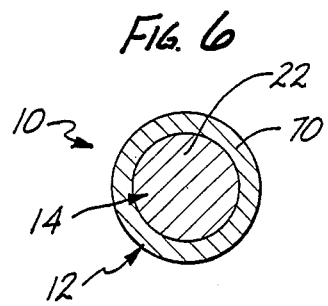
FIG. 6 is an axial cross-section of the fastener taken along line A—A in FIG. 1.

With reference to FIG. 6, the relative cross sectional areas of the sleeve wall 70 and pin shank section 22 may be compared in relation to the overall fastener cross sectional area, i.e. the area encompassed within the outer sleeve circumference. It has been determined for the fastener 10 of this invention, using similar materials for the pin and the sleeve and taking into account the weakening of the sleeve 12 by partial and selective annealement, that the optimum sleeve wall 70 cross sectional thickness is between 45% and 55% of overall fastener cross sectional area with a presently preferred figure of 50% for optimal balance of the relative strengths of the pin 14 and the sleeve 12.

For a given installed pin diameter, i.e. the diameter of pin section 22, the strength of the pin 14 is limited by the weakest point along the pin between the head 16 and the pull grooves 40. This weakest point necessarily must be at the pin break groove 24. The breakneck diameter therefore determines the maximum installation load which can be carried by the pin 14. In order to maximize the possible installation load for a given installed pin diameter it is therefore desirable to maximize the pin diameter at the breakneck. This in turn requires that the depth of the pull grooves be minimized since the pull groove diameter must be greater than the breakneck diameter. This objective is attained by roll forming the pull grooves in the manner already described, rather than machining or cutting the pull grooves into the pin section 26 which would result in a smaller pull groove diameter and consequently a still smaller breakneck diameter. Thus, the pin 14 is firstly fabricated with the shank section 26 diameter (the pitch diameter) approximately one pull groove depth less than the shank section 22, the pull groove dept being measured between the crest of pull groove land 42 and the actual bottom of the pull grooves 40. Upon subsequent rolling of the pull grooves themselves, the lands 42 are formed which have a diameter one pull groove depth greater than the pitch diameter 44, the net diametral difference between the bottoms of pull grooves 40 and crests of lands 42 being two pull groove depths. In the present fastener the reduction in diameter of the pin shank section 26 has been found optimum at 0.003 inches to 0.005 inches less than the sleeve inner diameter 30, with a preferred figure of approximately 0.004 inches for fastener diameters between 3/32 and ⅛ inches. It is anticipated that larger size fasteners would require appropriate modification in this respect. The aforesaid difference of some 0.004 inches is also the diametral difference between pin shank sections 22 and 26 and is twice the radial width of the stop shoulder 28. It must be appreciated that the step element at the shoulder 28 is not extraneously introduced for the sole purpose of stopping axial travel of the pin. Rather it is a necessary transition dictated by the aforementioned desirability to roll-form the pull grooves. Since this shoulder 28 is inherently created by these other requirements, it is advantageously used in the present fastener as a means for stopping axial travel of the pin with the breakneck flush to the sleeve head in cooperation with the deformable sleeve head 32.

It is presently preferred to make both the sleeve 12 and pin 14 of similar steel alloys, and to make the pin head/sleeve bond 46 by silver brazing. The sleeve head 32 is manufactured by cold forming continuous wall thickness tubing with a punch and dye in a conventional manner. The sleeve head undersurface 34 may have a conventional 100 degree included angle countersink, and the raised abutment 36 may be a conical end wall portion rising at an angle of between 15 to 30 degrees with a 23 degree angle being preferred relative to a plane transverse to the sleeve axis. The diameter of the breakneck 24 is approximately 85% of the installed pin diameter, a figure which substantially improves over breakneck sizes of prior art fasteners. This relatively large breakneck diameter allows use of a pin of relatively small installed diameter because the load bearing strength of the pin is not as greatly diminished by the breakneck groove as has been previously the case. The relatively small installed diameter of the pin permits a corresponding increase in the sleeve wall thickness, permitting the use of a more rugged sleeve which is successfully axially collapsed by a relatively small pin.

A thicker sleeve wall is not only desirable for improved installed fastener strength but it is conducive to improved compressive hole fill and proper blind head formations. Further, a heavy sleeve wall increases the area of contact between the blind-side end surface of the sleeve 12 and the undersurface 20 of the pin head, providing a more substantial bearing face of improved compressive hole filling action. Good hole filling action is further promoted by the ability to use seamless continuous wall thickness tubing as the starting material in the manufacture of the sleeve, because of the characteristic consistency of size, thickness and concentricity of such tubing. The uniformity of the seamless tubing coupled with the large bearing end surface of the sleeve is also beneficial in obtaining optimum blind head shapes and avoiding improper head forms such as tulip bulbs. Proper blind head formations are still further encouraged by the positive pre-locking bond between the sleeve end and the pin undersurface.

In certain applications it is highly desirable that the fastener feature a self-inspecting or "flagging" device. The term "flagging" is well understood in the art to define a condition whereby the fastener will selectively malfunction in the event of improper fastener use, selection, or quality problem associated with a specific fastener installation which is not otherwise apparent to the installer. The fastener if properly installed will show a pin broken off substantially flush with the outer face of the rivet head as shown in FIG. 5. If particular fastener is set with the pin broken in a position which is not substantially flush, the particular fastener should be considered and improper fastener installation and should be removed and replaced. These are well known and accepted practices in the art, and the range of acceptable and unacceptable installed pin positions are specified for each fastener size within a family of fasteners.

Following installation of the present fastener the pin is retained to the sleeve of the unit primarily or solely by the pre-locking bond 46. Should this bond fail or be of substandard strength, the defect is not discernible to the installer since it is hiden on the blind-side of the workpiece. It is therefore desirable to provide a self-testing feature for testing the integrity of the pin pre-locking bond 46 in each installed fastener. Such a feature can be incorporated in the present fastener by configuring and dimensioning the pin head 16 such that it has an axial shearing strength which is approximately 75% of the installation load required to compressively form the sleeve blind head 64. The pin head/sleeve bond 46 is then selected to have an axial shearing strength which when added to the pin head axial shear strength, the combined strengths will suffice to prevent shearing of the pin head and to properly form the blind head 64.

Thus, if in a particular fastener the pin head/sleeve bond 46, and particularly the axial component of the bond 46, should fail to meet the required shear strength characteristics, the pin head will yield axially under the installation load because without an adequate bond 46 the pin head alone has insufficient strength to transmit the compressive forces to the blind-side end of the sleeve so as to form the blind head. The pin head thus fails structurally, allowing the pin 14 to travel axially through the sleeve bore 30 and through the sleeve head bore 38' even though the sleeve head 32 has folded inwardly and the diameter of the sleeve head bore is reduced. In the absence of a positive interlock between the pin head and blind-side sleeve end the installation load applied between the pin and the sleeve head by the installation tool is insufficient to force the enlarged diameter of the stop shoulder 28 through the reduced diameter of the sleeve head bore 38'. The result is that the breakneck 24 moves out of the sleeve head 32 beyond the workpiece outer surface 56 and the installed pin breaks in a position which is substantially beyond flush. This condition is readily apparent visually or otherwise and is indicative of an improper fastener joint requiring replacement. The shear strength of the pin head 16 can be limited in a variety of ways. One approach is suggested in FIG. 7 where the pin head strength has been adjusted by provision of a conical dimple 72 in the end surface of the pin head. It is anticipated that the most likely failure mode is by shearing along dotted line 74. The pin head shear resistance can also be adjusted by varying the axial thickness of the radial shoulder of the pin head abutting against the sleeve, or by varying the curvature of the pin head shoulder 76, or by a combination of these methods.

The fastener structure disclosed herein can be manufactured by more efficient and economic use of materials than has been possible in the past. Both the pin and the sleeve can be formed of similar material and with little or no loss of material due to costly and waistful drilling or other metal cutting operations. Further, the consistency and uniformity of dimensional tolerances and concentricity made possible by use of continuous wall thickness tubing stock and the optimized balance of relative cross-sectional pin and sleeve wall areas made possible by the novel pin structure and cooperation with the deformable sleeve head produces a simple, reliable and strong blind fastener which can be installed with either single action or double action conventional blind rivet setting tools.

Figure 8:
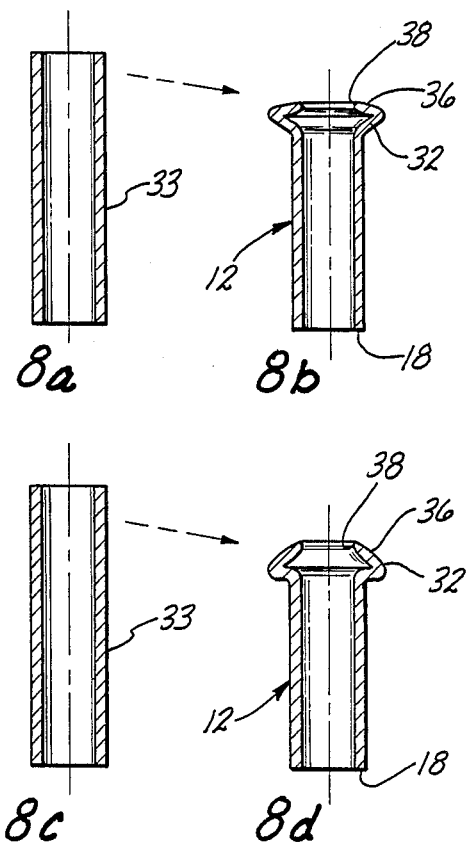

As may be seen FIGS. 8b and 8d the concept of a deformable sleeve head is not limited to a particular style of head. FIG. 8b shows a countersink style head while FIG. 8d illustrates the novel concept adapted to a protruding head style. These and still other head styles can be formed on sleeve blanks 33 shown in FIGS. 8a and 8c respectively which are sections of cylindrical tubing of continuous wall thickness and constant diameter cut from longer lengths of seamless tubing stock.

While the pre-locking feature enables a substantial advance over the prior art and is of major importance to the novel blind fastener here disclosed, it should also be understood that in less critical fastener applications it may be possible and advantageous to omit the pre-locking bond between the pin and the sleeve without otherwise altering the fastener structure which remains operative provided the pin head is constructed so as to alone withstand the installation load. In such a simplified, lower cost embodiment the pin is not positively retained in the installed fastener and reliance is placed only on the sleeve for integrity of the joint.

While a preferred embodiment of the invention has been shown and illustrated for purposes of explanation and clarity, it must be understood that still other changes, modifications and substitutions to the described embodiment can be made by those possessed of ordinary skill in the art without departing from the spirit and scope of the present invention which is defined only by the following claims.

What is claimed is:

1. A pull-type blind fastener suitable for installation with a single-action riveting tool comprising: a tubular sleeve having a blind side end and an opposite head end, a pin disposed slidably axially through said sleeve and projecting from said head end, said pin being permanently bonded to said blind side sleeve end for collapsing the sleeve upon application of sufficient differential pulling force between said projecting pin and the head end of said sleeve thereby to form a bulb on said sleeve; said sleeve being deformable by said relative pulling force prior to said bulb formation to a condition engageable with stop means on said pin for limiting axial travel of said pin through said sleeve in response to said differential pulling force, said sleeve initially being apertured to pass said stop means.

2. The fastener of claim 1 wherein both said pin and said sleeve are metallic and said pin is metallurgically bonded to said blind side end.

3. The fastener of claim 1 wherein said sleeve has an annealed intermediate section which collapses axially and bulges preferentially to form a blind-side bulb.

4. A pull-type blind fastener comprising: a tubular metallic sleeve having a blind side end and an opposite head end, a metallic pin disposed slidably axially through said sleeve and projecting from said head end, said pin being permanently metallurgically bonded to said blind side sleeve end for collapsing the sleeve upon application of sufficient differential pulling force between said projecting pin and the head end of said sleeve, said sleeve having an annealed intermediate section which collapses axially and bulges preferentially to form a blind-side bulb, stop means on said pin, and a head on said sleeve deformable by application of said relative pulling force to a condition engageable with said stop means for limiting axial travel of said pin through said sleeve in response to said differential pulling force.

5. A pull-type blind fastener comprising:
a tubular sleeve including a sleeve head with a raised abutment formed integrally thereon;
a pin axially slidable through said sleeve, said pin engaging said sleeve for axially collapsing the sleeve upon application of sufficient relative pulling force between the opposite free end of said pin and said raised abutment on said sleeve head;
stop means on said pin;
annular lands near said free pin end defining a series of pull grooves;
said sleeve head being initially apertured for passing said annular lands and said stop means, said head being deformable by said relative pulling force to an installed condition of reduced aperture wherein axial movement of the pin through the sleeve is stopped by engagement of said stop means with said deformed head.

6. The fastener of claim 5 wherein said pin includes a pin head engaging a blind side end of said sleeve, and prelocking bond means permanently locking said pin head to said sleeve against withdrawal therefrom.

7. The fastener of claim 6 wherein said pin head is designed to fail structurally upon application of said differential pulling force in the event said pre-locking bond fails to meet minimum strength criteria and thereby allow said pin to be drawn through said sleeve beyond engagement of said stop means to a flagging installed position visually indicatve of a substandard pre-locking bond.

8. A pull-type blind fastener comprising:
a tubular sleeve having a head structure integral with said sleeve; and
a pin axially slideable through said sleeve and locked at one end to said sleeve for axially collapsing said sleeve upon application of relative pulling force between a free end of said pin and said head, said head being deformable prior to said axial collapse by said relative pulling force for engaging stop means provided on said pin so as to limit axial travel of said pin through said sleeve.

9. The fastener of claim 8 further comprising prelocking bond means permanently securing said pin against withdrawal from said sleeve.

10. The fastener of claim 9 further comprising a pin head on said pin in abutment with said one sleeve end for locking said pin against axial movement through the sleeve towards said head structure, and flagging means for visually indicating a substandard pre-locking bond in an installed fastener.

11. A pull-type blind fastener comprising:
a tubular sleeve having a blind-side end and a sleeve head formed at its opposite end, said rivet head having a conical outer abutment defining a sleeve head bore;
a pin including a pin shank extending slideably axially through said sleeve and having a pin head in abutment with said blind-side sleeve end for locking said pin against axial movement through the sleeve towards said sleeve head, said pin stem having a first shank section of a first diameter adjacent said pin head and a second stem section of reduced diameter extending through said sleeve head to the exterior of said sleeve, a plurality of pull grooves between annular lands on second stem section exteriorly to said sleeve, a break groove between said first and second stem sections and a stop shoulder at the end of said first stem section adjacent said groove;
said sleeve head bore having a normal diameter admitting passage of said annular lands and said stop shoulder through said sleeve head such that said pin may be inserted into said sleeve from the blind-side end thereof, said sleeve head being deformable to an installed condition, upon application of relative axial pulling force between the pin and the rivet head so as to axially collapse said sleeve, the diameter of said bore in said installed condition being reduced to less than said first diameter thereby to engage said stop shoulder at said sleeve head for limiting axial movement of said pin through said sleeve with said break groove in predetermined relationship with said rivet head.

12. A pull-type blind fastener comprising:
a tubular sleeve having a blind-side end, a hollow clamshell sleeve head including an undersurface portion and a generally conical raised abutment formed on its opposite end, and an intermediate sleeve portion of reduced hardness;

a pin disposed axially through said sleeve, said pin having a pin head in abutment with said blind-side sleeve end so as to lock the pin against axial movement through the sleeve towards said head end, a first pin shank section connected to said pin head and having an outer diameter substantially equal to the inner diameter of said sleeve, and a second pin shank section of lesser diameter than said first section extending through an opening defined by said raised abutment in said sleeve head such that a portion of said second shank section is external to said sleeve;

a plurality of pull grooves on said external shank portion defined between annular lands of diameter greater than said second shank section;

a stop shoulder and a breakneck between said first and second shank sections, said sleeve head opening having a normal diameter greater than that of said annular lands and said stop shoulder so as to permit insertion of said pin through said sleeve from said blind-side end;

said raised abutment being deformable from a normal to a relatively flattened installed condition upon application of relative pulling force between said pull grooved external shank portion and said raised abutment sufficient to axially collapse said sleeve by pulling the pin partially through the sleeve so as to form a bulbed head on the sleeve within said portion of reduced hardness, said head opening being reduced in said installed condition prior to formation of said bulbed head to a diameter lesser than that of said stop shoulder thereby to stop axial displacement of said pin through said sleeve with said breakneck in substantially flush relationship to said sleeve head by engagement of said stop shoulder with the deformed abutment, whereby the installed pin shank has a continuous diameter substantially equal to the sleeve inside diameter.

13. The fastener of claim 12 wherein said pin head is pre-locked by a permanent bond to said blind-side sleeve end for retaining the pin against separation from the sleeve.

14. The fastener of claim 13 wherein said pin head is constructed and configured to fail structurally upon application of said relative pulling force in the event said bond fails to meet minimum strength criteria upon application of said sufficient relative pulling force thereby allowing the pin to be drawn through the sleeve beyond said flush relationship as a visual indicator of a substandard bond.

15. The fastener of claim 12 wherein said sleeve portion of reduced hardness is a selectively annealed sleeve portion intermediate two sleeve end sections of greater hardness.

16. The fastener of claim 12 wherein said sleeve is a length of continuous wall thickness cylindrical tubing of smooth internal bore between said blind-side end and said sleeve head.

17. The fastener of claim 16 wherein said head is cold formed on a length of continuous wall thickness constant diameter tubing.

18. The fastener of claim 12 wherein said sleeve and said pin are both made of substantially similar material.

19. The fastener of claim 12 wherein said sleeve and said pin are made of substantially similar metallic material.

20. The fastener of claim 12 wherein both said sleeve and said pin are made of steel.

21. The fastener of claim 12 wherein both said sleeve and said pin are made of aluminum.

22. The fastener of claim 13 wherein said pre-locking bond is a metallurgical bond.

23. The fastener of claim 13 wherein said bond alone is insufficient to lock said pin to said blind-side sleeve end against said sufficient relative pulling force without substantial resistance of said pin head against said blind-side sleeve end.

24. The fastener of claim 12 wherein said annular lands have a diameter substantially equal to that of said first shank section.

25. The fastener of claim 12 wherein the cross sectional area of said first pin shank section is less than 60 percent of the total cross sectional area encompassed by the sleeve circumference whereby a relatively heavy sleeve is axially collapsed by a relatively small pin.

26. The fastener of claim 12 wherein the diameter of said first shank section is at least equal to that of said annular lands and the diameter of said second shank section is slightly undersized to both said first shank section and said annular lands, said normal head opening diameter making a substantially close fit with said annular lands and reducing to an installed diameter smaller than the diameter of said first shank section.

27. The fastener of claim 26 wherein said breakneck has a diameter in excess of 70% of said first shank section diameter.

28. The fastener of claim 26 wherein the breakneck diameter is approximately 85% of said first shank section diameter.

29. The fastener of claim 12 wherein said abutment face in said normal condition is a generally conical top end wall of said sleeve head coaxial with said sleeve with said bore being at the narrow end of said conical portion and said abutment face in said installed condition is flattened to a substantially planar condition transverse to the sleeve axis.

30. The fastener of claim 28 wherein said sleeve head has a conical countersinkable undersurface connecting said top end wall to said sleeve.

31. The fastener of claim 31 wherein sleeve head is a round style head with a flat undersurface transverse to the sleeve axis and said top end face retains a domed configuration in said installed condition.

32. A pull-type blind fastener adapted for installation with either a single action or double action setting tool of the type having a nose adapted to engage and pull the pin of a fastener and an anvil on the nose for reactively engaging the sleeve of the fastener thereby to apply a relative pulling force between the pin and thus set the fastener in a workpiece, said fastener comprising:

a tubular sleeve having a sleeve bore of continuous inner diameter between a blind-side end and a sleeve head formed on its opposite end, and an intermediate selectively annealed section on said sleeve;

a pin having a pin shank axially displaceable through said sleeve bore but locked against such displacement towards said head by a pin head abutting against said blind-side sleeve end, said pin shank including a smooth ungrooved first pin shank section adjacent said head and having a diameter substantially equal to said continuous sleeve bore diameter, a second pin shank section of slightly reduced diameter relative to said first section and extending through a bore in said sleeve head a plurality of pull grooves defined between radial lands on said second pin shank section exteriorly to said sleeve head, a breakneck between said first and second sections, and a single stop shoulder at the end of said first section adjacent said breakneck that of said radial lands having a diameter substantially equal said stop shoulder;

said sleeve head including an outer abutment engageable by the anvil of the setting tool and deformable by the reactive engagement of the setting tool anvil from a normal condition wherein said bore has a normal diameter greater than said stop shoulder and admitting passage of said stop shoulder and radial lands to an installed condition wherein the diameter of said bore is reduced so as to engage said stop shoulder and thereby stop axial displacement of said pin through said sleeve with said breakneck in flush breaking alignment with said sleeve head, the pin portion remaining within said sleeve after installation having a continuous diameter substantially equal to the sleeve inside diameter.

33. A pull-type blind fastener adapted to secure a plurality of workpieces from one side of the workpieces and characterized by a tubular sleeve having a blind-side end and a rivet head formed at its opposite end and a pin extending axially slidably through said sleeve, the fastener being installed in aligned openings in said workpieces by applying axial pulling force to the pin and a reaction force against the rivet head sufficient to pull the pin through the sleeve and axially collapse the sleeve to form a retaining bulb on the blind-side of the workpieces, the improvement comprising:

means locking said pin to said blind-side end of said sleeve against axial displacement towards said rivet head, said pin having a first stem section of first diameter adjacent said blind-side end and a second stem section of second reduced diameter extending through an aperture in said rivet head and terminating exteriorly of said sleeve, a plurality of pull grooves on said exterior stem portion, a break groove of a third diameter lesser than said second diameter between said first and second stem sections, said first stem section terminating in a stop shoulder at said groove;

said rivet head bore having a normal diameter sufficient to admit passage of said pull grooves such that said pin may be inserted into said sleeve and through the rivet head from said blind-side end, said rivet head being deformable by said same reaction force and prior to formation of said bulb to an installed condition of reduced bore aperture wherein the rivet head stops axial movement of said pin through said sleeve at said stop shoulder with said break groove in predetermined relationship with said rivet head, whereby said second stem section can be broken off said pin at said groove leaving said first section terminating substantially flush with said rivet head.

* * * * *